US010024413B2

(12) United States Patent
Lemmers, Jr. et al.

(10) Patent No.: US 10,024,413 B2
(45) Date of Patent: Jul. 17, 2018

(54) INPUT DRIVEN GEAR FOR A DIFFERENTIAL

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 532 days.

(21) Appl. No.: 14/678,259

(22) Filed: Apr. 3, 2015

(65) Prior Publication Data

US 2016/0290469 A1    Oct. 6, 2016

(51) Int. Cl.
| F16H 55/17 | (2006.01) |
| F16H 55/06 | (2006.01) |
| F16H 47/00 | (2006.01) |
| F16H 47/04 | (2006.01) |
| F16H 48/06 | (2006.01) |

(52) U.S. Cl.
CPC .......... *F16H 55/17* (2013.01); *F16H 47/00* (2013.01); *F16H 47/04* (2013.01); *F16H 55/06* (2013.01); *F16H 48/06* (2013.01)

(58) Field of Classification Search
CPC .......... F16H 47/00; F16H 55/17; F16H 47/04
See application file for complete search history.

(56) References Cited

U.S. PATENT DOCUMENTS

| 2,288,206 | A |   | 6/1942  | Pierpont |
| 3,043,090 | A |   | 7/1962  | Sundt |
| 3,527,121 | A |   | 9/1970  | Moore |
| 3,851,537 | A | * | 12/1974 | Nickstadt ............... F16H 1/222 |
|           |   |   |         | 74/404 |
| 4,252,035 | A |   | 2/1981  | Cordner et al. |
| 4,488,053 | A |   | 12/1984 | Cronin |
| 4,609,842 | A |   | 9/1986  | Aleem et al. |
| 4,617,835 | A |   | 10/1986 | Baker |
| 4,734,590 | A |   | 3/1988  | Fluegel |
| 4,953,663 | A |   | 9/1990  | Sugden |
| 4,965,477 | A |   | 10/1990 | Stadler et al. |
| 5,028,803 | A |   | 7/1991  | Reynolds |
| 5,472,383 | A |   | 12/1995 | McKibbin |

(Continued)

*Primary Examiner* — Derek D Knight
(74) *Attorney, Agent, or Firm* — Cantor Colburn LLP

(57) ABSTRACT

Embodiments herein relate to piece-part, sub-assembly, assembly, and component levels of a differential composed of a sun gear configuration and utilized in an integrated drive generator. An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

14 Claims, 7 Drawing Sheets

(56) References Cited

U.S. PATENT DOCUMENTS

| | | |
|---|---|---|
| 5,728,022 A | 3/1998 | Schultz |
| 5,845,731 A | 12/1998 | Buglione et al. |
| 6,178,840 B1 | 1/2001 | Colbourne et al. |
| 6,258,004 B1 | 7/2001 | Johnston |
| 6,799,953 B2 | 10/2004 | Nelson |
| 6,893,208 B2 | 5/2005 | Frosini et al. |
| 7,195,578 B2 | 3/2007 | Dalenberg et al. |
| 7,472,547 B2 | 1/2009 | Grosskopf et al. |
| 8,187,141 B2 | 5/2012 | Goleski et al. |
| 8,267,826 B2 | 9/2012 | Duong et al. |
| 8,485,936 B2 | 7/2013 | Makulec et al. |
| 8,925,421 B2 | 1/2015 | Vanderzyden et al. |
| 9,115,794 B2 | 8/2015 | Vanderzyden et al. |
| 9,410,572 B2 | 8/2016 | Shoup et al. |
| 2004/0042698 A1 | 3/2004 | Yamamoto et al. |
| 2005/0006164 A1 | 1/2005 | Teraoka |
| 2006/0079370 A1 | 4/2006 | Kushino |
| 2006/0205560 A1 | 9/2006 | Meier |
| 2008/0108471 A1* | 5/2008 | Deutsch .................. F16H 48/08 475/160 |
| 2009/0101465 A1 | 4/2009 | Hart et al. |
| 2009/0203492 A1 | 8/2009 | Okabe |
| 2010/0167863 A1 | 7/2010 | Lemmers |
| 2010/0284836 A1 | 11/2010 | Grosskopf et al. |
| 2011/0105270 A1 | 5/2011 | Matsuoka et al. |
| 2013/0068057 A1 | 3/2013 | Grosskoph |
| 2013/0260951 A1 | 10/2013 | Norem et al. |
| 2013/0288840 A1 | 10/2013 | Grosskopf et al. |
| 2014/0008170 A1 | 1/2014 | Vanderzyden et al. |
| 2014/0030356 A1 | 5/2014 | Jiang et al. |
| 2015/0013488 A1 | 1/2015 | Matsuoka et al. |
| 2015/0125277 A1 | 5/2015 | Ward |
| 2016/0003339 A1 | 1/2016 | Roberts, III et al. |
| 2016/0016368 A1 | 1/2016 | Kunishima |
| 2016/0032969 A1 | 2/2016 | Kovach et al. |
| 2016/0215815 A1 | 7/2016 | Ryu et al. |

* cited by examiner

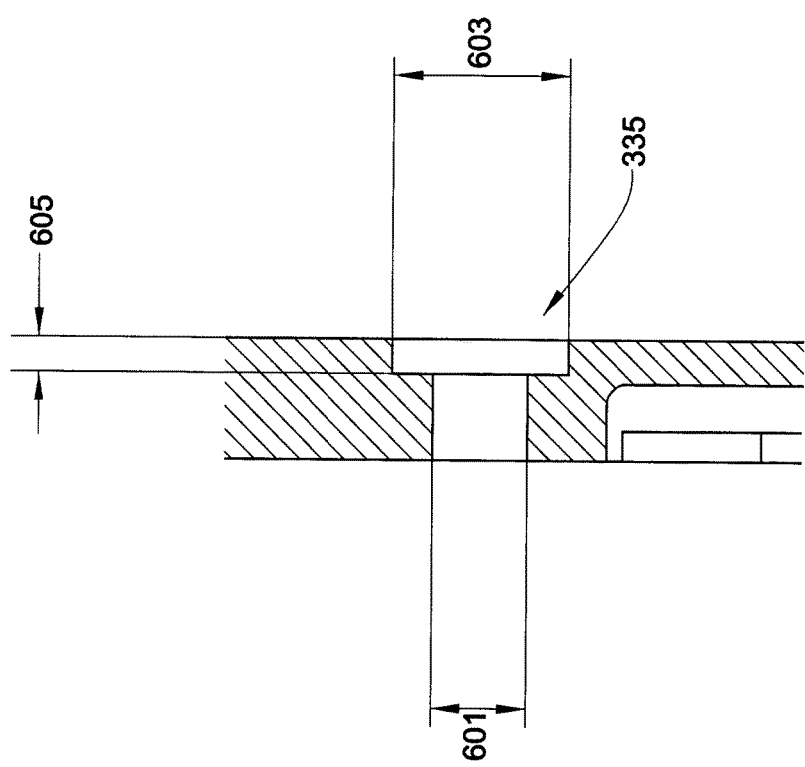

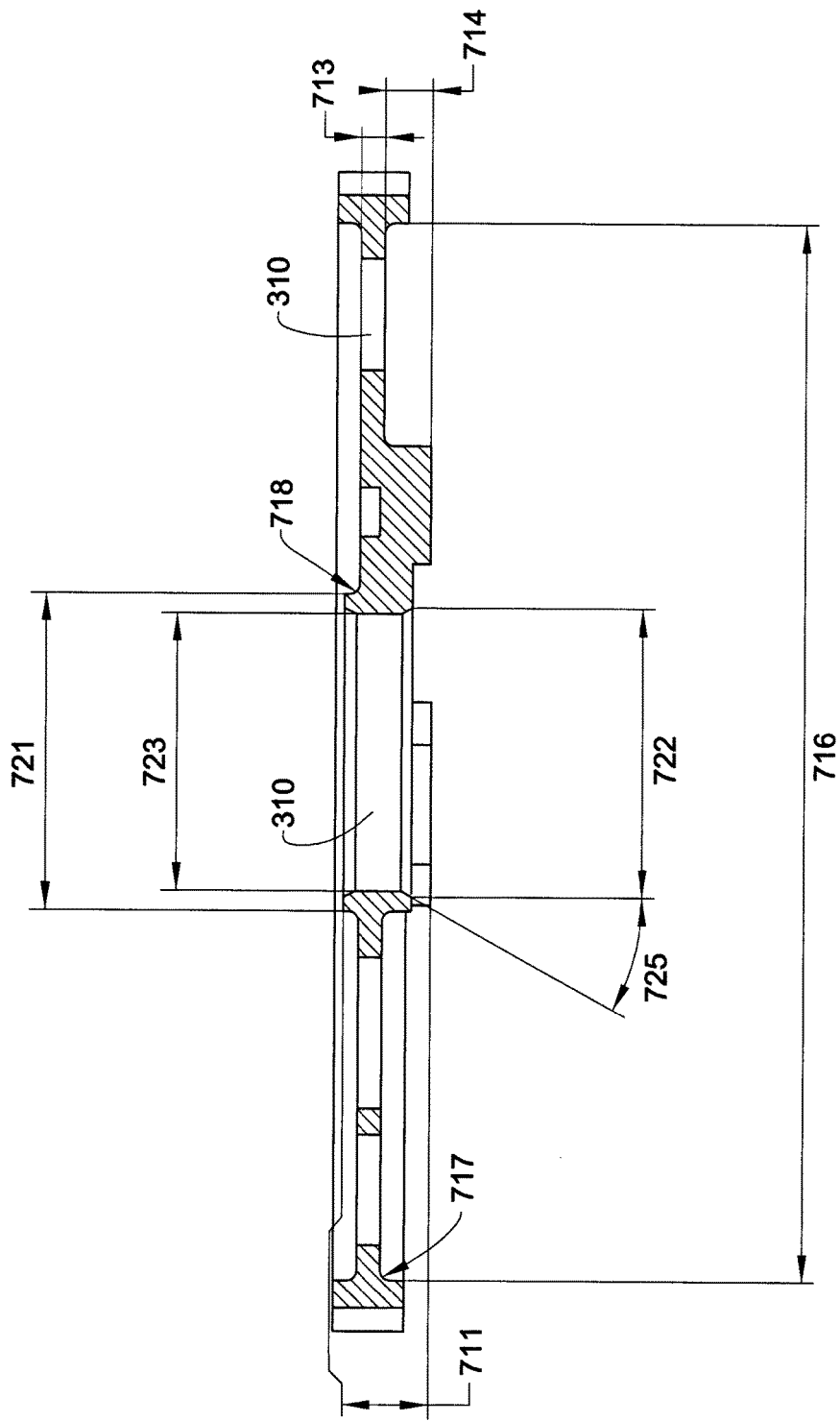

INPUT DRIVEN GEAR FOR A DIFFERENTIAL

BACKGROUND OF THE INVENTION

Exemplary embodiments pertain to integrated drive generators and, more particularly, to a differential with a sun gear configuration for an integrated drive generator.

In general, aircraft electric power generation utilizes a hydro-mechanical transmission that receives a power input, at variable speed, from an engine to drive a generator at a constant speed. The hydro-mechanical transmission includes a differential to convert the variable speed of the engine to the constant speed for the generator.

At present, a configuration of the differentials used in the hydro-mechanical transmission for aircraft electric power generation is a two ring gear configuration. The two ring gear configuration includes a first ring gear to first planet gear mesh, a first planet gear to second planet gear mesh, and second planet gear to second ring gear mesh configuration. The two ring gear configuration has a specific differential ratio of one (1) due to the first and second planet gears being the same size. This specific differential ratio limits the two ring gear configuration to a lower input speed range. In addition, the two ring gear configuration forces specific packaging arrangements of the hydro-mechanical transmission. Particularly, the differential must be side-to-side with a hydraulic unit and include gearing between the differential and the hydraulic unit.

BRIEF DESCRIPTION OF THE INVENTION

According to one embodiment of the present invention, an input driven gear for an integrated drive generator is provided. The input driven gear comprises a gear body having an outer diametric wall, an inner diametric wall, a plurality of fastening holes, and a fastening structure aligned with the plurality of fastening holes, wherein the outer diametric wall includes a plurality of outer gear teeth.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 6-7 illustrate cross sectional views of an input driven gear.

DETAILED DESCRIPTION OF THE INVENTION

Figure 1:
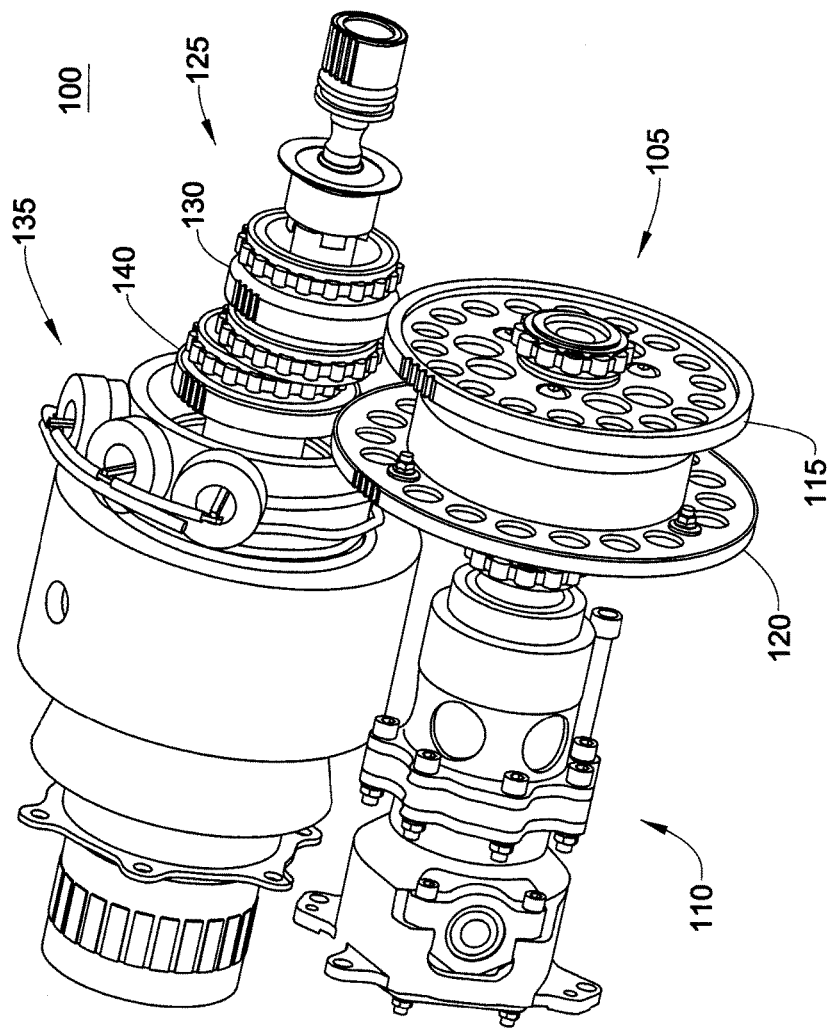
FIG. 1 depicts a perspective view of a differential of and integrated drive generator.

In contrast to the sun-less differential type described above, embodiments herein relate to piece-part, sub-assembly, assembly, and component levels of a differential composed of a sun gear configuration and utilized in an integrated drive generator.

An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

The differential can include speed members, such as a carrier shaft, which supports the planet gears; a sun gear; and a ring gear. The carrier shaft is driven based on the variable speed input from the engine. Note that the speed of the carrier shaft can be directly proportional to the engine speed. The carrier shaft through the planet gears drives the sun gear, which in turn drives the ring gear. The sun gear itself is independently varied (e.g., actively controlled) so that as the variable speed of the carrier shaft is transferred to the sun gear, the ring gear can be driven at a constant speed. The ring gear, thus, drives the synchronous salient pole generator at the constant speed output.

To actively control the sun gear, a piston, pump, and motor set of the hydraulic unit are utilized to vary a speed of the sun gear. The piston, pump, and motor set can be a back-to-back axial piston pump configuration, where one portion is a motor and the other portion is a pump. A first portion of the back-to-back axial piston pump configuration is driven proportionally off the speed of the engine (e.g., similar to the carrier shaft) and utilizes a variable swash plate to control displacement of the first portion. Note that based on the angle of the variable swash plate and whether that angle is a negative or positive sign the first portion can be a pump or a motor. Thus, the first portion drives or is driven by a fixed displacement pump (e.g., a second portion of the back-to-back axial piston pump configuration), which in turn controls the sun gear speed.

In view of the above, the differential of the integrated drive generator comprises a specific differential ratio (e.g., at or close to 0.5) that enables the receipt of any input speed along an extensive range. In this way, the integrated drive generator can be utilized in a high speed pad of an aircraft electric power generation system. In addition, the differential enables packaging advantages for the integrated drive generator, such as enabling the differential to be in-line with the hydraulic unit (e.g., enables coaxial packaging), which eliminates gearing between the sun gear and the hydraulic unit and reduces a size of a front region of the integrated drive generator.

Turning now to FIG. 1, a perspective view of an integrated drive generator 100 (e.g., epicyclic gear train that performs electrical power generation and speed component) that comprises a differential 105. The differential 105 includes an input driven gear 115 and an output driven gear 120 (not that these gear spins at a constant speed). The differential 105 is in-line with a hydraulic unit 110, which may include two pumps. The input driven gear 115 of the differential 105 is operatively coupled to an input system 125 via input drive gear 130. The output driven gear 120 of the differential 105 is operatively coupled to a generator 135 (e.g., main stator where electricity is generated) via a driven gear 140. Based on this operative coupling, the differential 105 converts a variable speed input from the input system 125 supplied by a variable speed drive source into a constant speed output employed to drive generator 135. The variable speed drive source can be an aircraft engine; however, it should be understood, that the variable speed drive source may take on a variety of forms.

Figure 2:
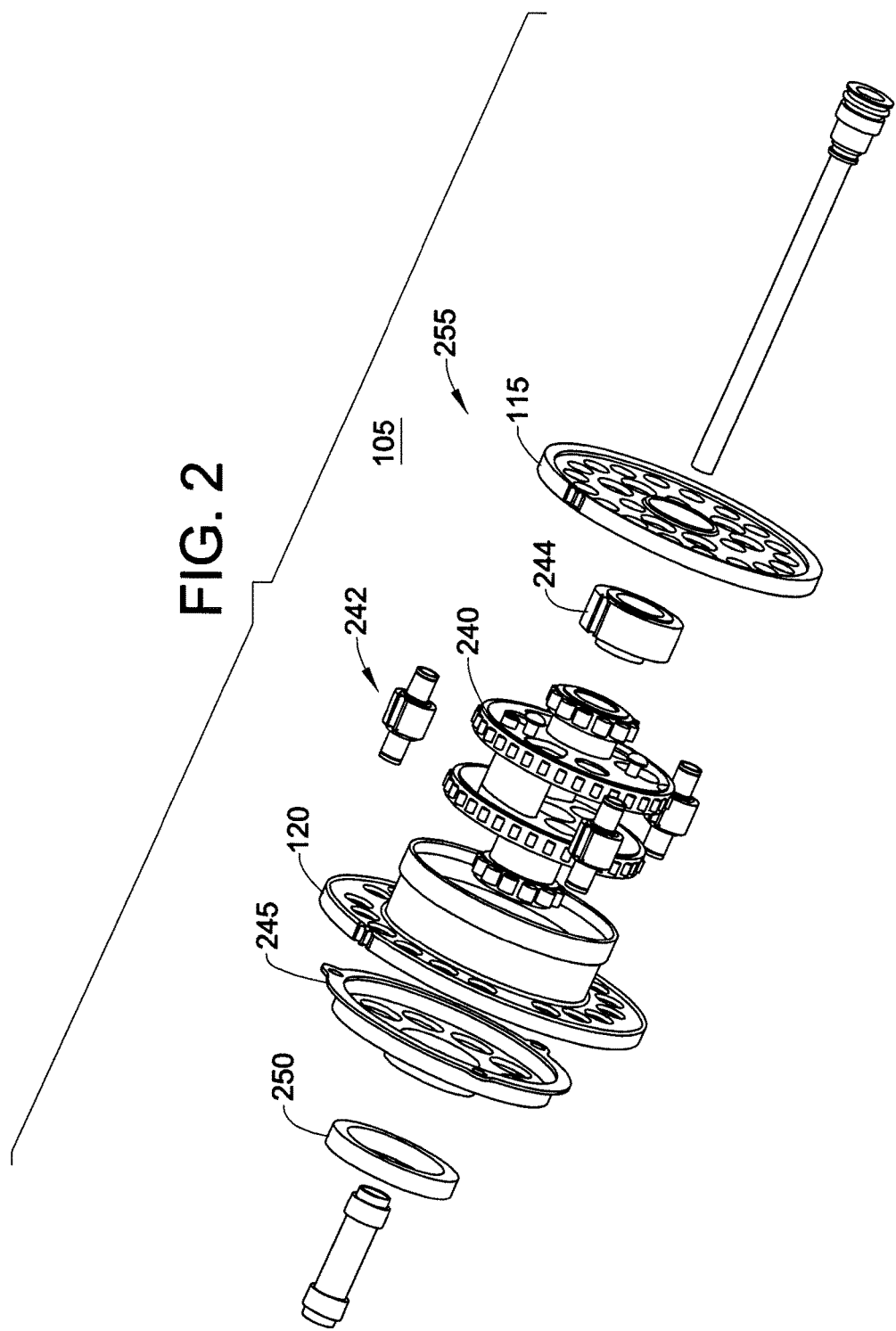
FIG. 2 depicts an exploded view of the differential of FIG. 1.

FIG. 2 depicts an exploded view of the differential 105, which includes the input driven gear 115, the output driven gear 120, a carrier shaft 240, a planet gear system 242, a sun gear 244, an accessory drive gear hub 245, an accessory drive gear 250, a first shaft 255 that spins at a fixed speed, a second shaft 260 that spins at a variable speed, and journal bearings (not shown). The input driven gear 115 is operatively connected to the sun gear 244. The sun gear 244, along with the planet gear system 242, is supported by the carrier shaft 240. The carrier shaft 240 is coupled to the output driven gear 120, which is engages the driven gear 140 on generator 135. The output driven gear 120 is further operatively coupled to the accessory drive gear hub 245, which supports the accessory drive gear 250. The input driven gear 115 will now be described below with reference to FIGS. 3-6.

Figure 3:
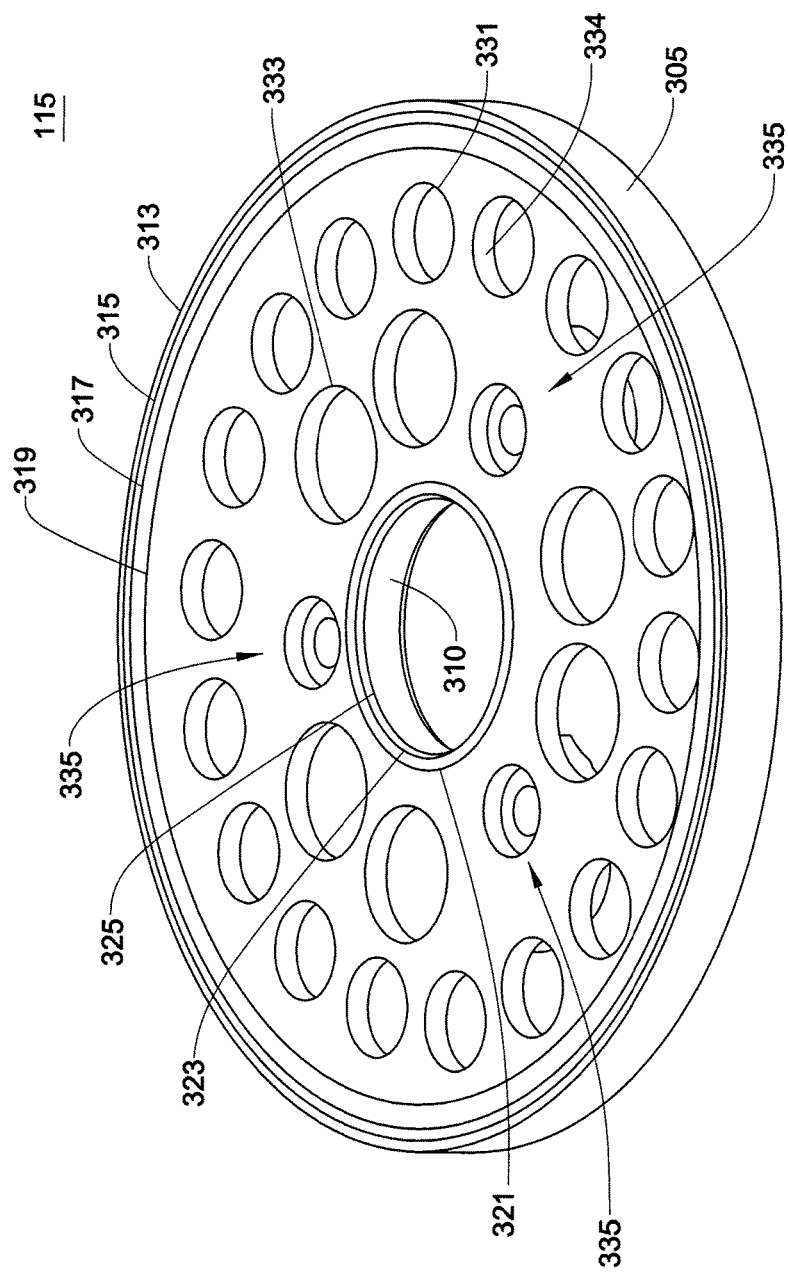
FIG. 3 illustrates an isometric view of an input driven gear.

FIG. 3 illustrates an isometric view of an input driven gear. The input driven gear 115 comprises a gear body having an outer diametric wall 305, an inner diametric wall 310, a first outer diametric edge 313, a second outer diametric edge 315, a third outer diametric edge 317, a fourth outer diametric edge 319, a first inner diametric edge 321, a second inner diametric edge 323, and a third inner diametric edge 325. The diameter of the input driven gear 115 can be between 5 to 6 inches (e.g., 5.498).

In accordance with an aspect of an embodiment, the outer diametric wall 305 can include a plurality of outer gear teeth. The outer gear teeth may be 112 in number and mate with another gear with 50 teeth in number, in accordance with an embodiment. The outer gear teeth may include side surfaces that are carbonized and/or a top surface that is not carbonized.

Further, the input driven gear includes a plurality of outer holes 331 and a plurality of inner holes 333. The holes 331, 333 may be circumferentially aligned in a pattern on the input driven gear 115. For example, the plurality of outer holes 331 may total 18 and be symmetrically spaced about a geometric center of the input driven gear 115. The plurality of inner holes 333 may total 6 and be symmetrically spaced about a geometric center of the input driven gear 115. The holes 331, 333 can add structural stability and/or decrease the total mass of the input driven gear 115. Each hole 331, 333 may have an inner hole wall 334.

The input driven gear 115 also includes a plurality of fastening holes 335 for attaching the input driven gear to the carrier shaft 215. The plurality of fastening holes 335 may total 3 and may be symmetrically spaced about the geometric center of the input driven gear 115. In some embodiments, the plurality of inner holes 333 and the plurality of fastening holes 335 may be intersperse amongst each other and/or divide one another into groupings as shown in FIG. 3. In accordance with another aspect of an embodiment, fasteners (e.g., any combination of screws, pins, and bolts) may be utilized to attach the input driven gear 115 to the carrier shaft 215.

Figure 4:
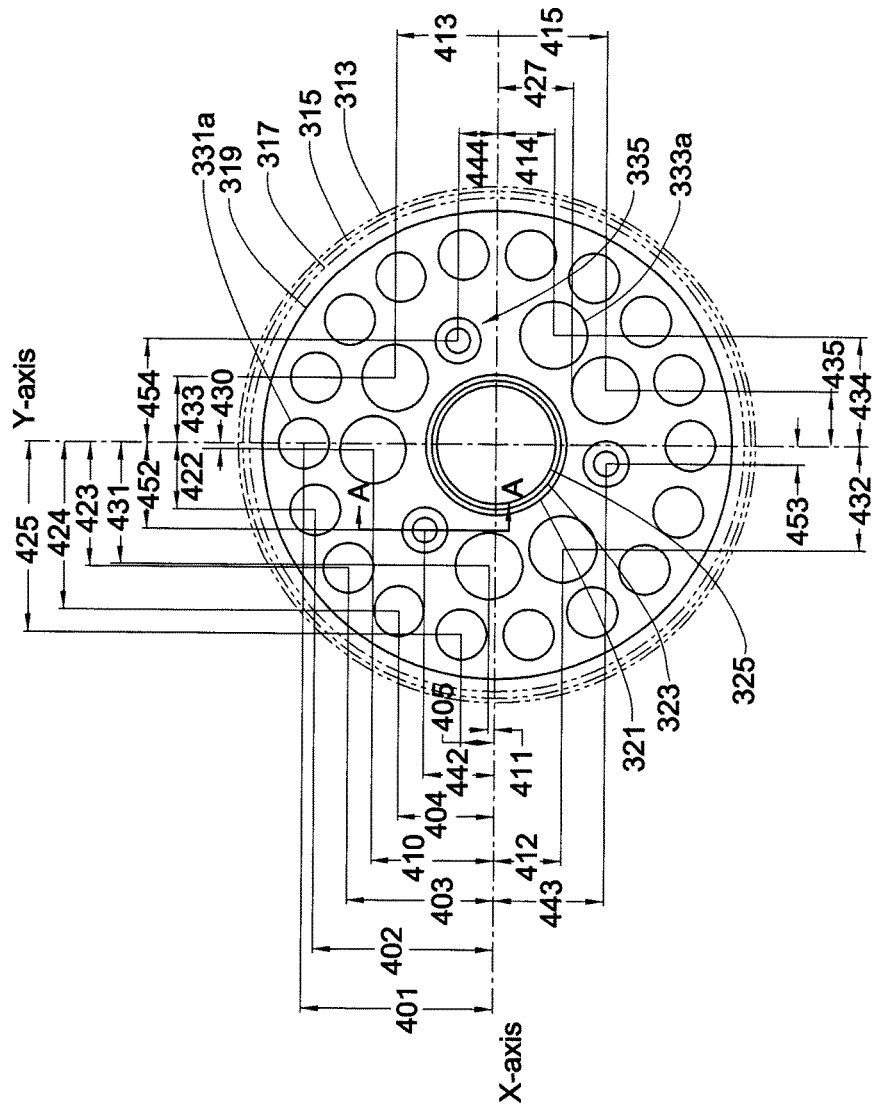
FIG. 4 illustrates a top down view of an input driven gear.

Turning now to FIG. 4, a top down view of the input driven gear 115 of FIG. 1 is depicted, along with a plurality of demarcations. Each demarcation is illustrative of a particular portion of the input driven gear 115. For instance, in FIG. 4, demarcations 401-405 illustrate distances between geometric centers of a select set of outer holes 331 and an X-axis. Further, demarcations 410-415 illustrate distances between geometric centers of the plurality of inner holes 333 and the X-axis. Demarcations 422-425 illustrate distances between geometric centers of the select set of outer holes 331 and a Y-axis (note that hole 331*a* is one the Y-axis). Demarcation 427 illustrates a distance between a radial edge of hole 333*a* and the X-axis. Demarcations 430-435 illustrate distances between geometric centers of the plurality of inner holes 333 and the Y-axis. Demarcations 442-444 illustrate distances between geometric centers of the plurality of fastening holes 335 and the X-axis. Demarcations 452-454 and illustrate distances between geometric centers of the plurality of fastening holes 335 and a Y-axis.

In some embodiments, the demarcation 401 can be about 2.1 inches (e.g., 2.150); the demarcation 402 can be about 2.0 inches (e.g., 2.020); the demarcation 403 can be about 1.6 inches (e.g., 1.647); the demarcation 404 can be about 1.0 inches (e.g., 1.075); and the demarcation 405 can be about 0.3 inches (e.g., 0.374). Further, in some embodiments, the demarcation 410 can be about 1.3 inches (e.g., 1.374); the demarcation 411 can be about 0.1 inches (e.g., 0.096); the demarcation 412 can be about 0.7 inches (e.g., 0.729); the demarcation 413 can be about 1.1 inches (e.g., 1.140); the demarcation 414 can be about 0.6 inches (e.g., 0.645); and the demarcation 415 can be about 1.2 inches (e.g., 1.236).

In some embodiments, the demarcation 422 can be about 0.7 inches (e.g., 0.732); the demarcation 423 can be about 1.3 inches (e.g., 1.382); the demarcation 424 can be about 1.8 inches (e.g., 1.862); and the demarcation 425 can be about 2.1 inches (e.g., 2.117). Further, in some embodiments, demarcation 427 can be about 0.8 inches (e.g., 0.861). In addition, in some embodiments, the demarcation 430 can be about 0.05 inches (e.g., 0.048); the demarcation 431 can be about 1.3 inches (e.g., 1.372); the demarcation 432 can be about 1.1 inches (e.g., 1.166); the demarcation 433 can be about 0.7 inches (e.g., 0.769); the demarcation 434 can be about 1.2 inches (e.g., 1.214); and the demarcation 435 can be about 0.6 inches (e.g., 0.603).

In some embodiments, the demarcation 442 can be about 0.7 inches (e.g., 0.779); the demarcation 443 can be about 1.1 inches (e.g., 1.180); and the demarcation 444 can be about 0.4 inches (e.g., 0.401). Further, in some embodiments, the demarcation 452 can be about 0.9 inches (e.g., 0.912); the demarcation 453 can be about 0.2 inches (e.g., 0.219); and the demarcation 454 can be about 1.1 inches (e.g., 1.131).

Figure 5:
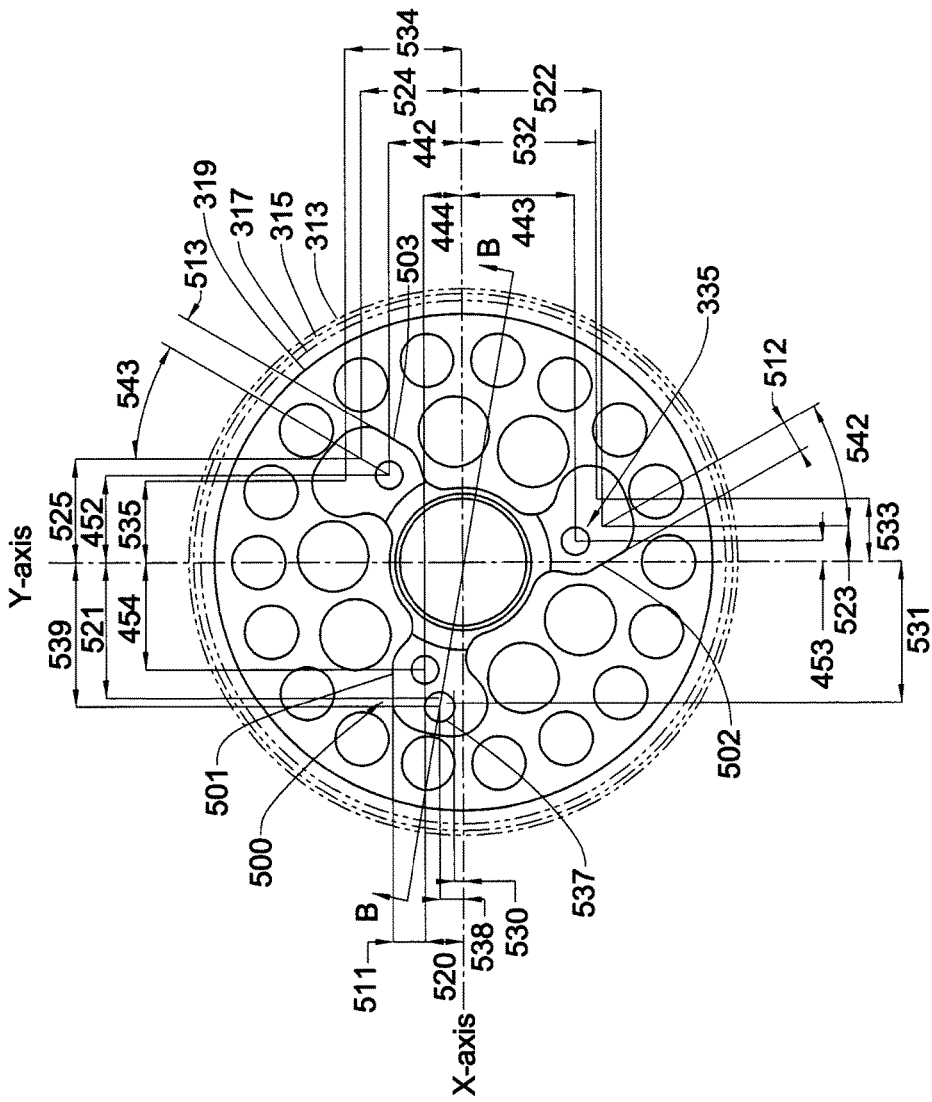
FIG. 5 illustrates a bottom up view of an input driven gear.

Turning now to FIG. 5, a bottom up view of the input driven gear 115 of FIG. 1 is depicted. The bottom up view shows a fastening structure 500. The fastening structure 500 can have three legs, each of which correspond to one of the fastening holes 335. FIG. 5 also illustrates a plurality of demarcations. For instance, in FIG. 5, demarcation 511 illustrates a distance between a first edge 501 of a first leg of the fastening structure 500 to a primary focal point of the first leg. Demarcation 512 illustrates a distance between a second edge 502 of a second leg of the fastening structure 500 to a primary focal point of the second leg. Similarly, demarcation 513 illustrates a distance between a third edge 503 of a third leg of the fastening structure 500 to a primary focal point of the third leg. In some embodiments, the demarcations 511, 512, 513 can be about 0.3 inches (e.g., 0.350).

The primary focal point of the first leg is located by demarcations 520, 521, where are respectively measured from the X-axis and Y-axis. In some embodiments, the demarcation 520 can be about 0.4 inches (e.g., 0.401), while the demarcation 520 can be about 1.4 inches (e.g., 1.435).

The primary focal point of the second leg is located by demarcations 522, 523, where are respectively measured from the X-axis and Y-axis. In some embodiments, the demarcation 522 can be about 1.4 inches (e.g., 1.443), while the demarcation 523 can be about 0.3 inches (e.g., 0.370).

The primary focal point of the third leg is located by demarcations 524, 525, where are respectively measured from the X-axis and Y-axis. In some embodiments, the demarcation 524 can be about 1.0 inches (e.g., 1.042), while the demarcation 525 can be about 1.0 inches (e.g., 1.065).

Each leg of the fastening structure 500 may also include a secondary focal point. The secondary focal point of the first leg is located by demarcations 530, 531, where are respectively measured from the X-axis and Y-axis. In some embodiments, the demarcation 530 can be about 0.1 inches (e.g., 0.102), while the demarcation 531 can be about 1.4 inches (e.g., 1.487).

The secondary focal point of the second leg is located by demarcations 532, 533, where are respectively measured from the X-axis and Y-axis. In some embodiments, the demarcation 532 can be about 1.3 inches (e.g., 1.339), while the demarcation 533 can be about 0.6 inches (e.g., 0.655).

The secondary focal point of the third leg is located by demarcations 534, 535, where are respectively measured from the X-axis and Y-axis. In some embodiments, the demarcation 534 can be about 1.2 inches (e.g., 1.237), while the demarcation 535 can be about 0.8 inches (e.g., 0.832).

Also, in FIG. 5, an alignment unit 537 is centered on the first leg, as indicated by demarcations 538, 539. In some embodiments, the demarcation 538 can be about 0.2 inches (e.g., 0.2520), while the demarcation 539 can be about 1.5 inches (e.g., 1.5210).

Further, demarcations 542, 543 illustrate an angle at which both the second edge and the third edge are shifted with respect to the y-axis. This angled may be any slope at or between 15 degrees to 75 degrees. In some embodiments, the angle is 30 degrees.

FIGS. 6-7 illustrate cross sectional views of the input driven gear 115. FIG. 6 illustrates a cross sectional view of the input driven gear 115 across the line A-A as illustrated in FIG. 4, and FIG. 7 illustrates a cross sectional view of the input driven gear 115 across the line B-B as illustrated in FIG. 5.

In FIG. 6, the dimensions of at least one fastening hole 335 are illustrated by demarcations, where demarcation 610 is a diameter of a first portion of the at least one fastening hole 335, demarcation 603 is a diameter of a second portion of the at least one fastening hole 335, and demarcation 605 is a height of the second portion of the at least one fastening hole 335. In accordance with an aspect of an embodiment, the demarcation 601 can be about 0.2 inches (e.g., 0.281); the demarcation 602 can be about 0.5 inches (e.g., 0.500); and the demarcation 603 can be about 0.1 inches (e.g., 0.102).

In FIG. 7, additional dimensions of the input driven gear 115 are illustrated by demarcations. Demarcation 711 is a thickness of a center portion of the input driven gear 115 from a top surface of the input driven gear 115 to a surface of the fastening structure 500. Demarcation 713 is a height of the inner hole wall 334, and demarcation 714 is a height between the surface of the fastening structure 500 from a bottom surface of the input driven gear 115. Demarcation 716 is a diameter of the third outer diametric edge 317, while demarcation 717 identifies a groove or curved bevel between the third outer diametric edge 317 and the fourth outer diametric edge 319. Similarly, demarcation 718 identifies a groove or curved bevel between the first inner diametric edge 321 and the top surface of the input driven gear 115. Demarcations 721, 722, 723 are diameters respectively associated with the first inner diametric edge 321, the second inner diametric edge 323, and the third inner diametric edge 325 (e.g., the inner diametric wall 310), while demarcation 725 illustrates an angle of a surface connecting the first inner diametric edge 321 and the second inner diametric edge 323. Note that any surface connecting any of the various edges and wall of the input driven gear 115 may be independent angled at any slope at or between 15 degrees to 75 degrees. Alternatively, any of the edges may respectively be a wall and another surface.

In some embodiments, the demarcation 711 can be about 0.4 inches (e.g., 0.425); the demarcation 713 can be about 0.1 inches (e.g., 0.125); and the demarcation 714 can be about 0.2 inches (e.g., 0.227). Further, in some embodiments, the demarcation 716 can be about 5.0 inches (e.g., 5.190). The demarcations 717, 718 may illustrate a 0.060 inch turn from the first inner diametric edge 321 and the top surface of the input driven gear 115. The demarcation 721 can be about 1.5 inches (e.g., 1.560); the demarcation 722 can be about 1.4 inches (e.g., 1.420); and the demarcation 723 can be about 1.3 inches (e.g., 1.3592), while the angle of the demarcation 725 can be 30 degrees.

The terminology used herein was chosen to best explain the principles of the embodiments, the practical application or technical improvement over technologies found in the marketplace, or to enable others of ordinary skill in the art to understand the embodiments disclosed herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. Furthermore, the term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An input driven gear for an integrated drive generator, comprising:
   a gear body having an outer diametric wall, an inner diametric wall, a plurality of fastening holes, and a fastening structure aligned with the plurality of fastening holes,
   wherein the outer diametric wall includes a plurality of outer gear teeth,
   wherein at least one of the plurality of outer gear teeth has a carbonized side.

2. The input driven gear of claim 1, wherein a number of the plurality of outer gear teeth 112.

3. The input driven gear of claim 1, wherein a diameter of the input driven gear is 5.4 inches.

4. The input driven gear of claim 1, wherein a diameter of the inner diametric wall is 1.35 inches.

5. The input driven gear of claim 1, wherein the plurality of fastening holes numbers three,
   wherein the fastening structure comprises three legs,
   where each leg of the three legs aligns with one of the plurality of fastening holes.

6. The input driven gear of claim 1, wherein an input driven gear is included in a differential of the integrated drive generator,
   wherein the differential is operatively coupled to an input system via the input drive gear fixed to a carrier shaft, and
   wherein the differential is operatively coupled to a generator via an output driven gear fixed to the carrier shaft.

7. The input driven gear of claim 1, wherein the input driven gear is included in a differential of the integrated drive generator,
   wherein the differential is in-line with a hydraulic unit of the integrated drive generator, and
   wherein the hydraulic unit comprises at least one pump.

8. The input driven gear of claim 1, comprising:
   an inner diametric edge,
   wherein a surface connects the inner diametric wall with the inner diametric edge.

9. The input driven gear of claim 8, wherein the surface is angled at 30 degrees.

10. The input driven gear of claim 8, wherein the inner diametric edge is a part of the inner diametric wall.

11. The input driven gear of claim 1, wherein at least one of the plurality of fastening holes comprises of a first portion at a first diameter and a second portion at a second diameter,
    wherein the first diameter is smaller than the second diameter.

12. The input driven gear of claim 11, wherein a height of the second portion is 0.1 inches.

13. The input driven gear of claim 11, wherein the first diameter is 0.2 inches.

14. The input driven gear of claim 11, wherein the second diameter is 0.5 inches.

* * * * *